United States Patent
Ishimaru et al.

(10) Patent No.: US 11,900,777 B2
(45) Date of Patent: Feb. 13, 2024

(54) WORK CONTENT DETECTION DETERMINATION DEVICE, WORK CONTENT DETECTION DETERMINATION SYSTEM, AND WEARABLE SENSOR EMBEDDED GLOVE

(71) Applicant: Hitachi, Ltd., Tokyo (JP)

(72) Inventors: Tetsuya Ishimaru, Tokyo (JP); Hiroyuki Yoshimoto, Tokyo (JP); Yoshihiro Wakisaka, Tokyo (JP); Nobuyuki Sugii, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 50 days.

(21) Appl. No.: 17/435,894

(22) PCT Filed: Feb. 13, 2020

(86) PCT No.: PCT/JP2020/005504
§ 371 (c)(1),
(2) Date: Sep. 2, 2021

(87) PCT Pub. No.: WO2020/255480
PCT Pub. Date: Dec. 24, 2020

(65) Prior Publication Data
US 2022/0207978 A1 Jun. 30, 2022

(30) Foreign Application Priority Data
Jun. 21, 2019 (JP) .................. 2019-115047

(51) Int. Cl.
*G08B 21/02* (2006.01)
*G01L 1/20* (2006.01)
(Continued)

(52) U.S. Cl.
CPC ............. *G08B 21/02* (2013.01); *G01L 1/20* (2013.01); *G01P 13/00* (2013.01); *G01P 15/00* (2013.01); *H04R 1/08* (2013.01)

(58) Field of Classification Search
CPC .......... G08B 21/02; G01L 1/20; G01L 5/228; G01P 13/00; G01P 15/00; G01P 15/18;
(Continued)

(56) References Cited

U.S. PATENT DOCUMENTS 6,044,153 A * 3/2000 Kaschke ............... H04B 1/385
379/433.06
9,910,491 B2 * 3/2018 Mutz ..................... H04Q 9/00
(Continued)

FOREIGN PATENT DOCUMENTS

JP 2008-293794 A 12/2008
JP 2010-186651 A 8/2010
(Continued)

OTHER PUBLICATIONS

International Search Report with English translation and Written Opinion issued in corresponding application No. PCT/JP2020/005504 dated Apr. 21, 2020.
Office Action issued in corresponding Chinese Application No. 202080024412.2 with English Machine Translation dated Dec. 5, 2022 (24 pages).

*Primary Examiner* — Mohamed Barakat
*Assistant Examiner* — Rufus C Point
(74) *Attorney, Agent, or Firm* — Foley & Lardner LLP

(57) ABSTRACT

A work detection determination system performs detection determination on a work with high accuracy.
The work detection determination system includes a glove that is worn on a hand of a worker and includes a microphone detecting a work sound of a hand operation in which the hand works on a work target through a contact of the hand with the work target, a pressure sensor detecting a
(Continued)

pressure of a work of the hand operation, a motion sensor detecting a motion of the hand operation, and a transmitting unit transmitting a sound signal of the microphone, a pressure signal of the pressure sensor, and a motion signal of the motion sensor; a receiving unit that receives the sound signal, the pressure signal, and the motion signal transmitted from the transmitting unit; a work determination unit that performs detection determination of a work content of the worker by using the sound signal, the pressure signal, and the motion signal; and a notification unit that notifies a determination result of the work determination unit.

15 Claims, 11 Drawing Sheets

(51) Int. Cl.
   G01P 13/00 (2006.01)
   G01P 15/00 (2006.01)
   H04R 1/08 (2006.01)
(58) Field of Classification Search
   CPC .... H04R 1/08; H04R 3/005; H04R 2201/023; H04R 1/028; A41D 13/00; A41D 13/08; A41D 19/00; A41D 19/015; H01R 43/00
   See application file for complete search history.

(56) References Cited

U.S. PATENT DOCUMENTS

| | | | |
|---|---|---|---|
| 2009/0010456 A1* | 1/2009 | Goldstein | H04R 25/02 381/56 |
| 2010/0242599 A1* | 9/2010 | Ogawa | H01R 43/26 73/488 |
| 2012/0067142 A1 | 3/2012 | Shimojo et al. | |
| 2013/0009993 A1* | 1/2013 | Horseman | G16H 40/63 345/633 |
| 2016/0365078 A1* | 12/2016 | Sims | G10D 13/26 |
| 2017/0086519 A1* | 3/2017 | Vigano' | A63B 71/141 |
| 2017/0309152 A1* | 10/2017 | Dinkins | G08B 21/043 |
| 2018/0082702 A1* | 3/2018 | Nickel | G10L 25/06 |
| 2020/0126447 A1* | 4/2020 | Yoshimoto | G09B 19/003 |
| 2021/0177341 A1* | 6/2021 | Singh | A61B 5/0002 |
| 2023/0166366 A1* | 6/2023 | Hsu | G05B 19/4183 702/189 |

FOREIGN PATENT DOCUMENTS

| | | | | |
|---|---|---|---|---|
| JP | 2010-271242 A | | 12/2010 | |
| JP | 2010271242 A | * | 12/2010 | G01L 1/20 |
| JP | 2011-159204 A | | 8/2011 | |

* cited by examiner

[FIG. 1]
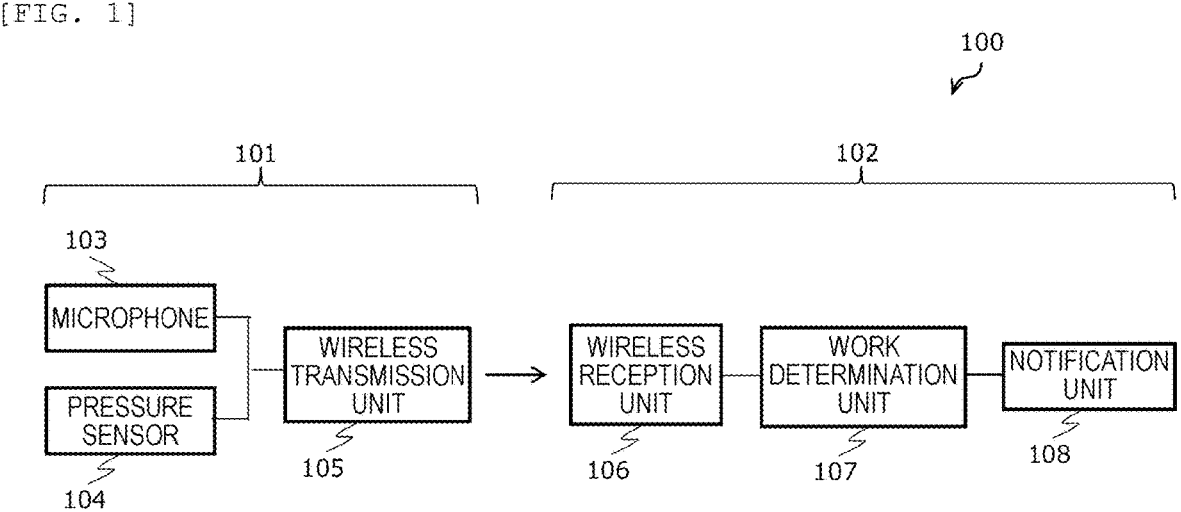
[FIG. 2]
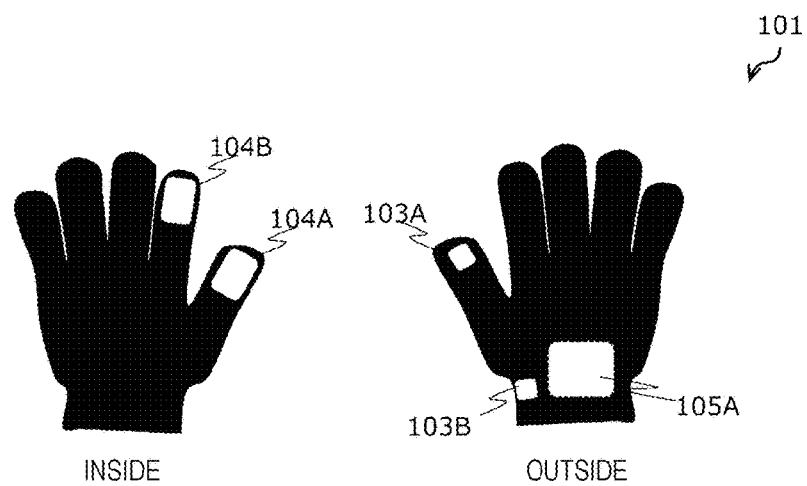

[FIG. 3]
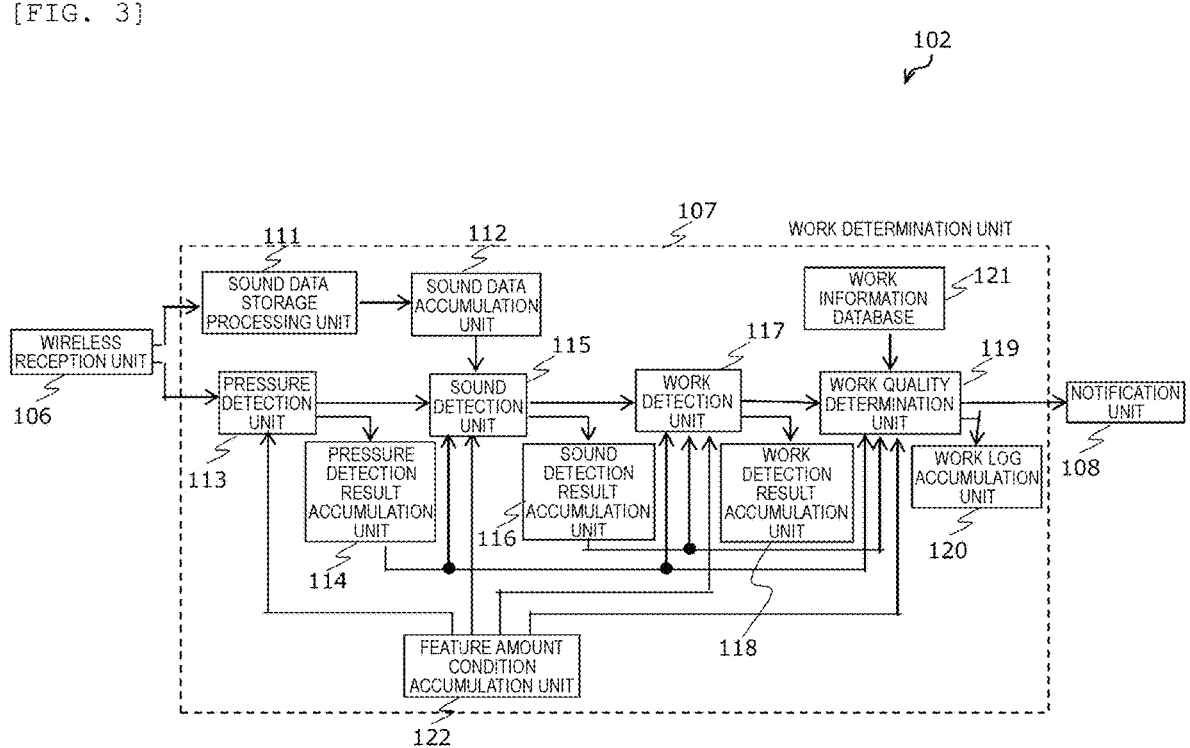

[FIG. 4]
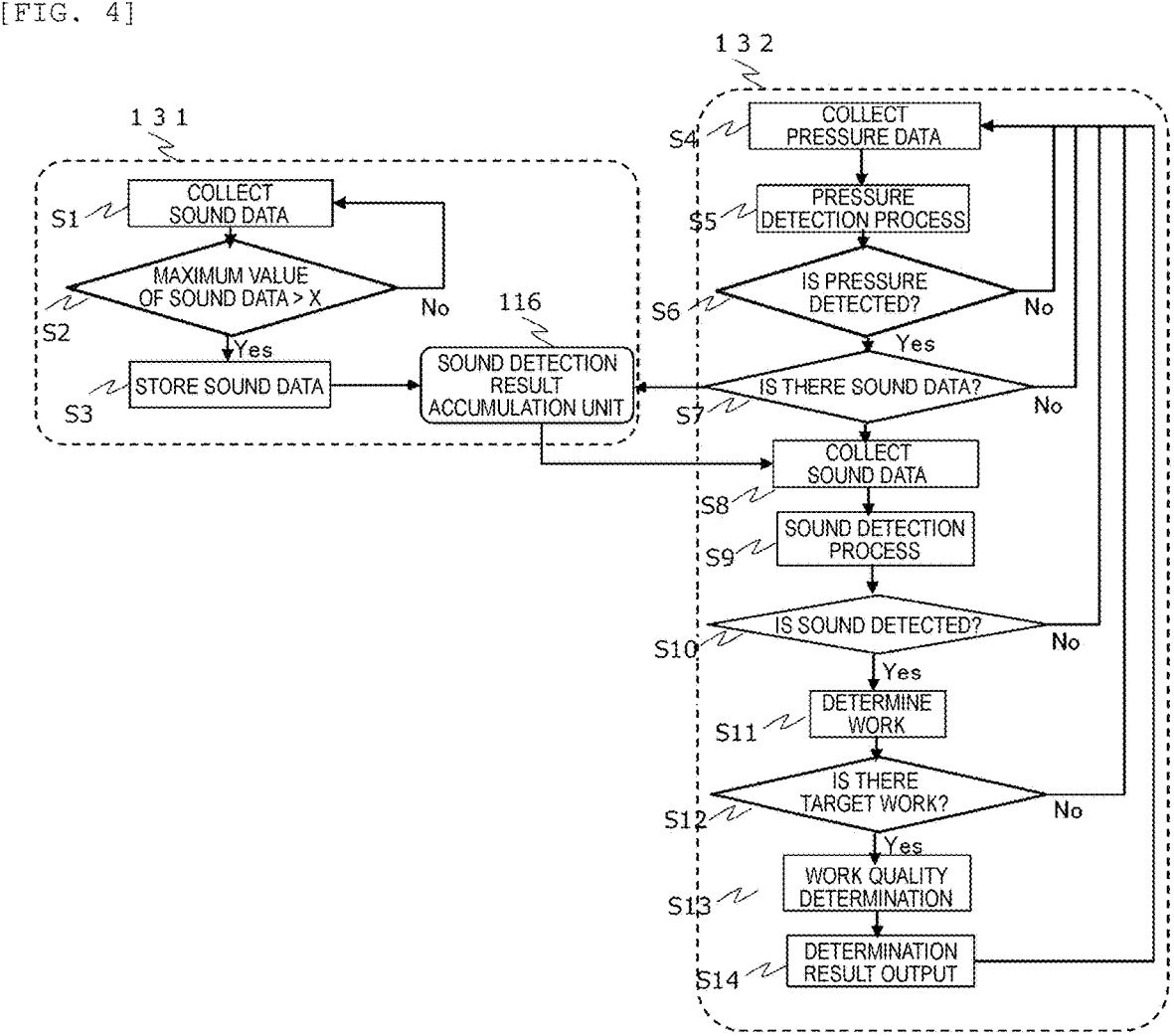

[FIG. 5A]
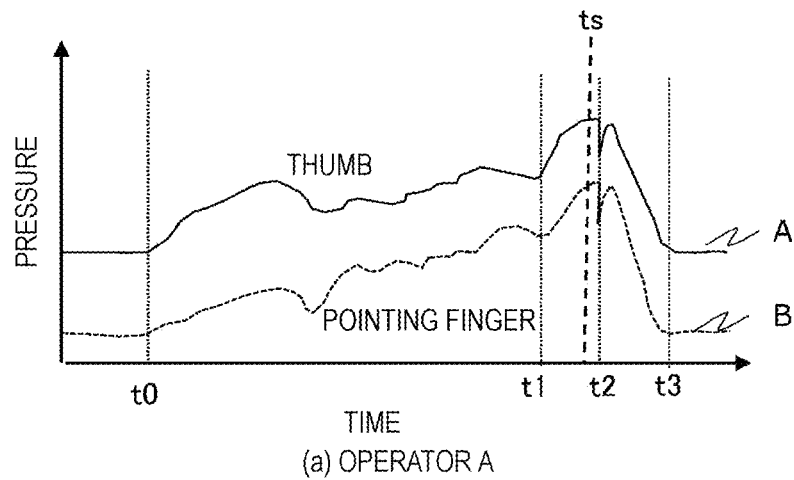
(a) OPERATOR A
[FIG. 5B]
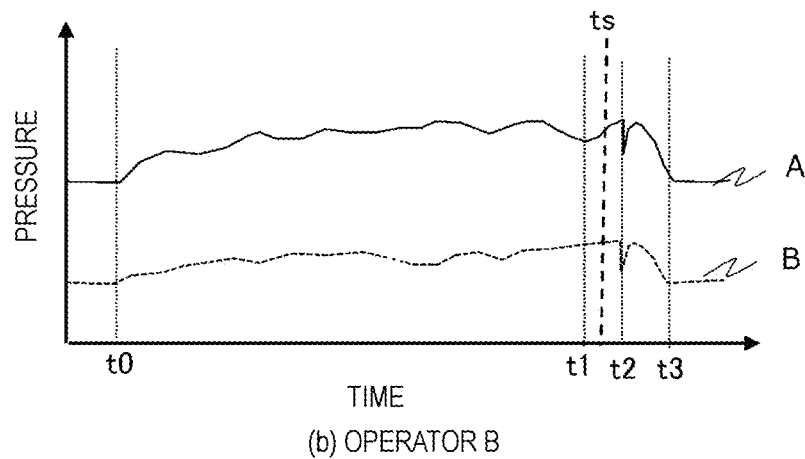
(b) OPERATOR B

[FIG. 5C]
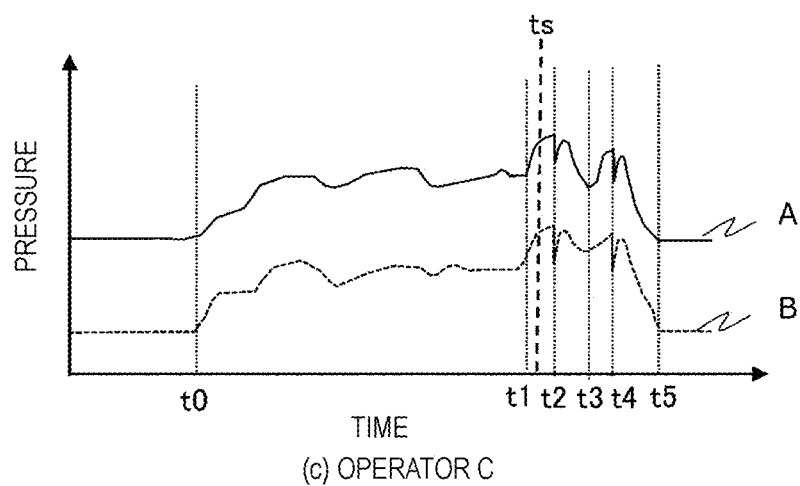
(c) OPERATOR C
[FIG. 6A]
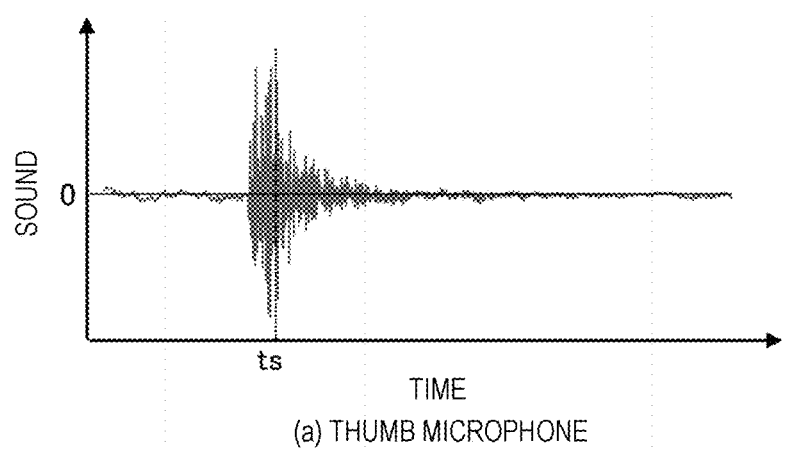
(a) THUMB MICROPHONE

[FIG. 6B]
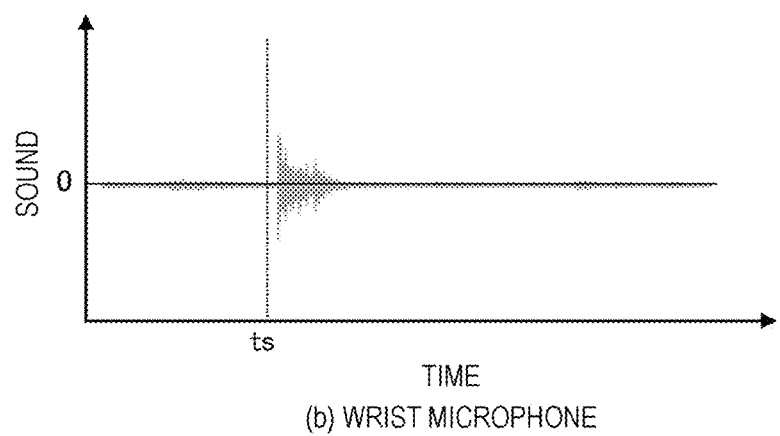

[FIG. 7]
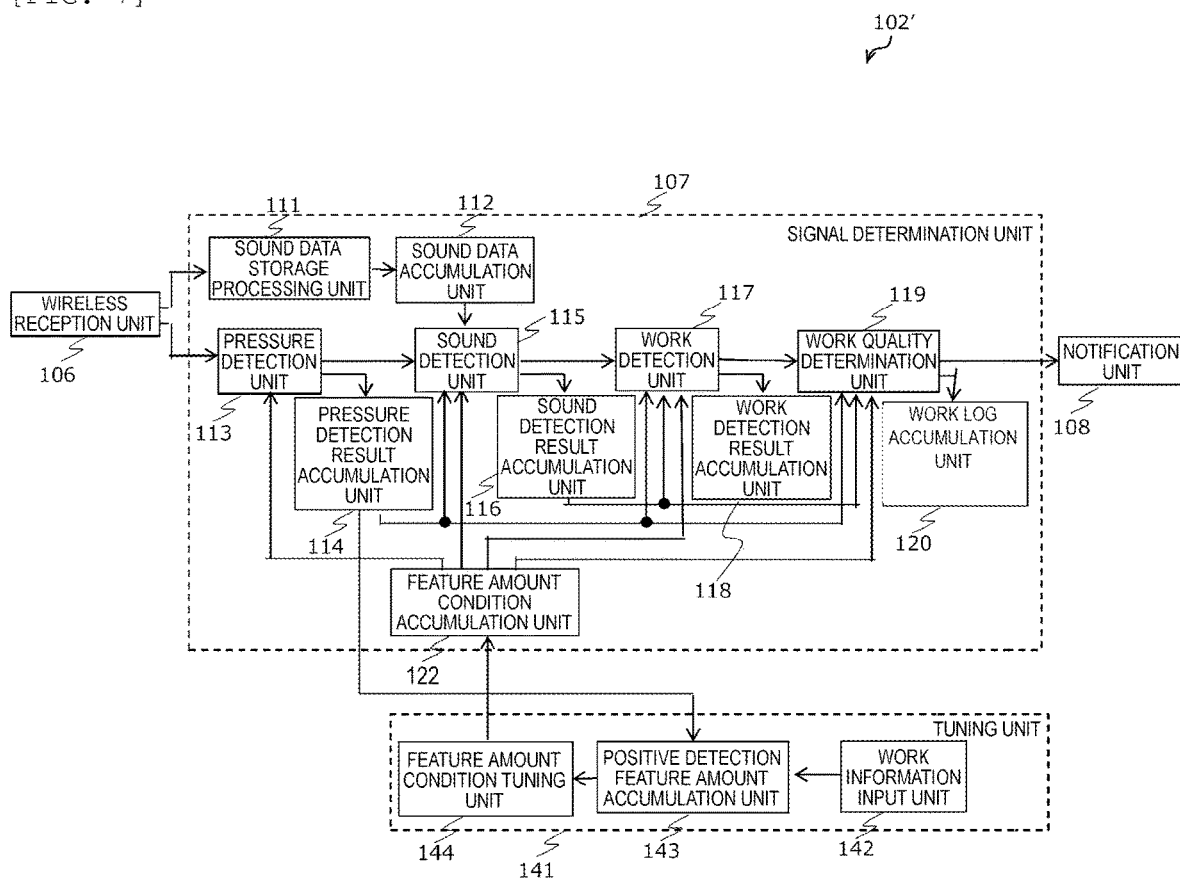

[FIG. 8]
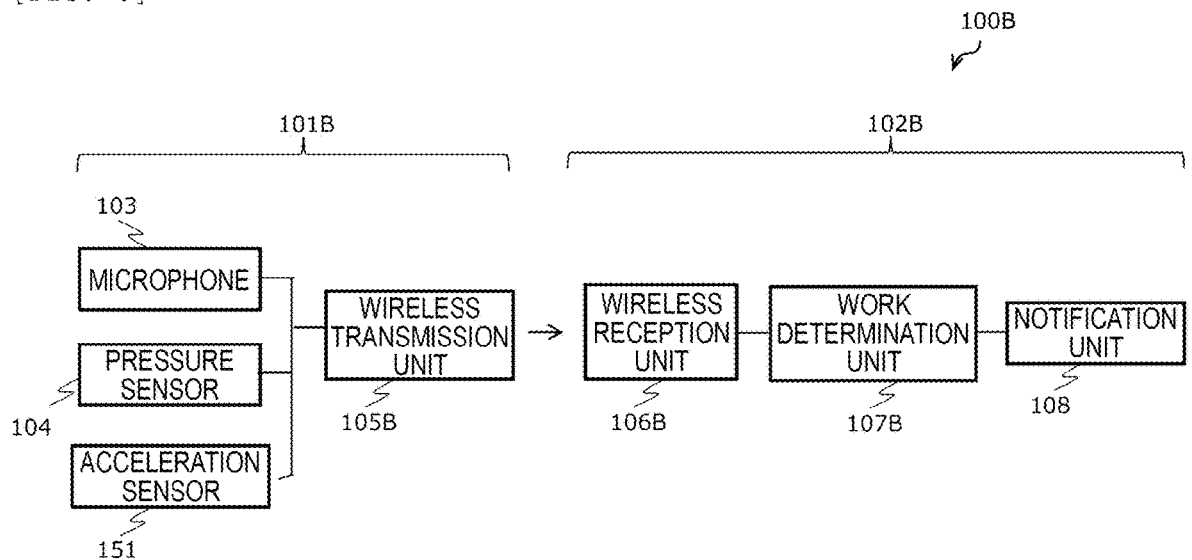
[FIG. 9]
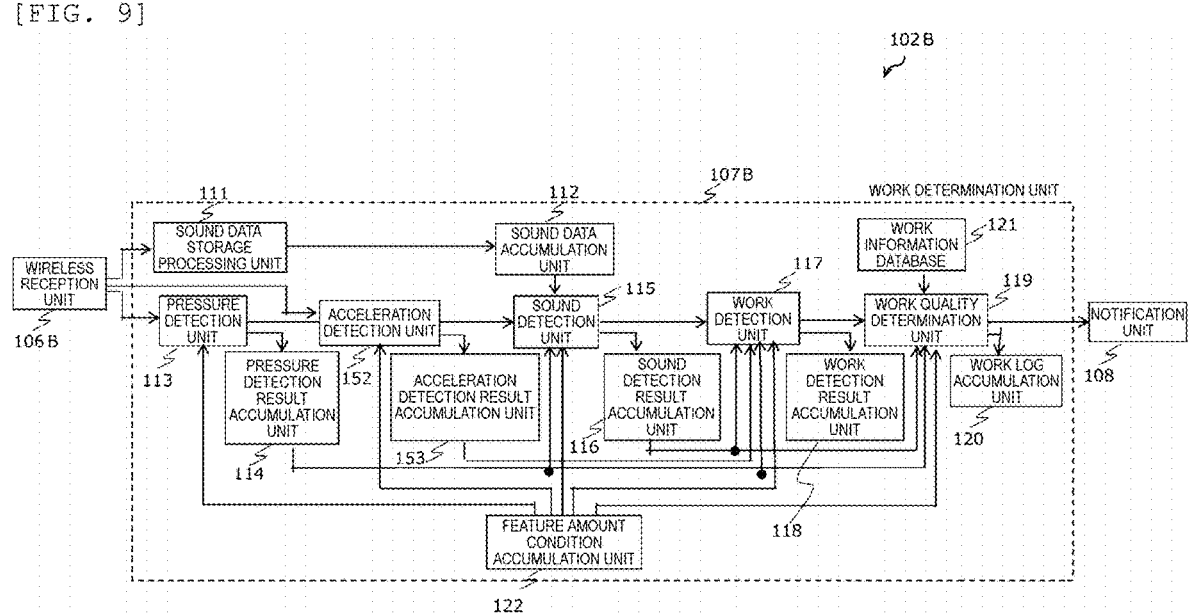

[FIG. 10]
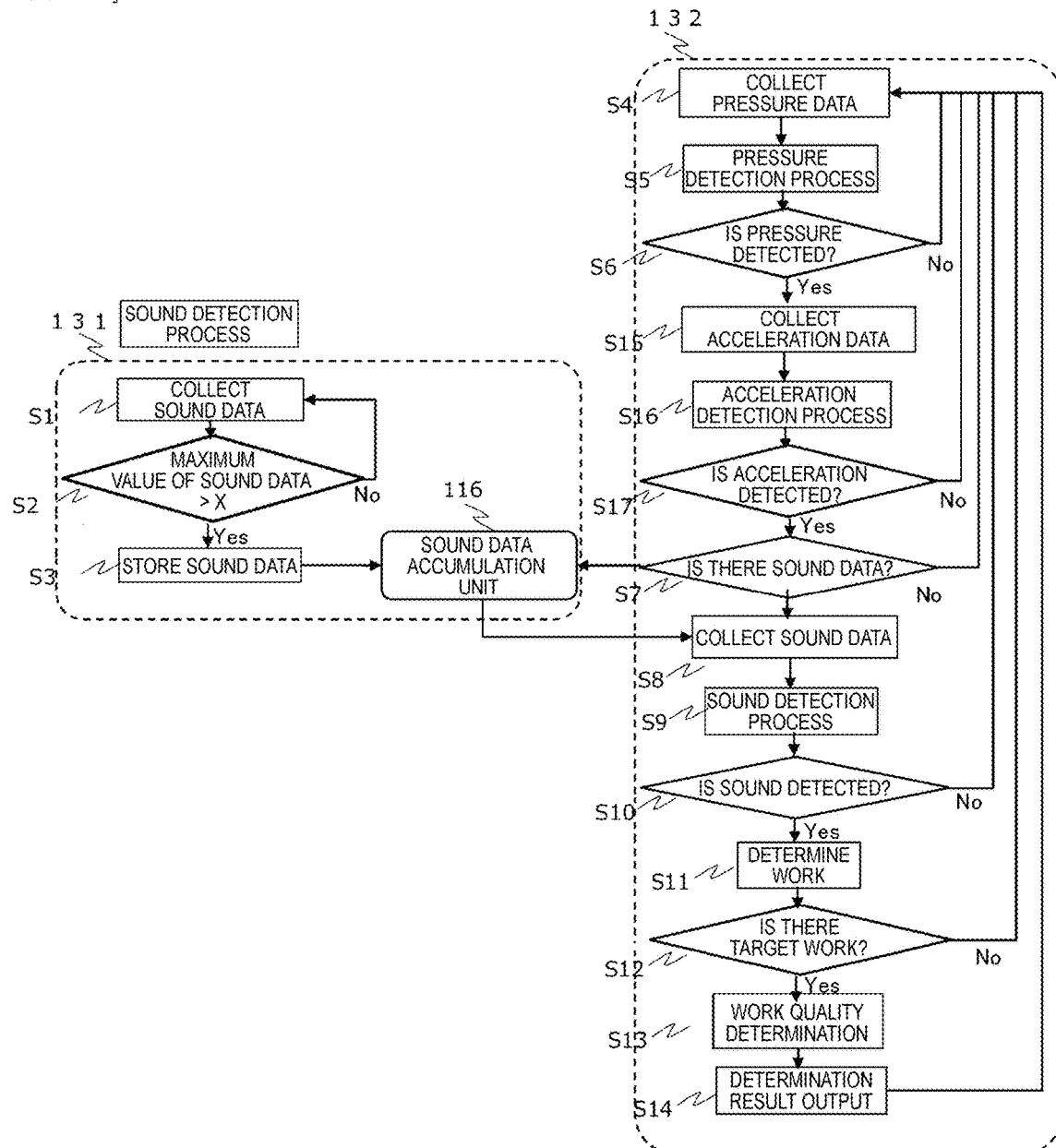

[FIG. 11]
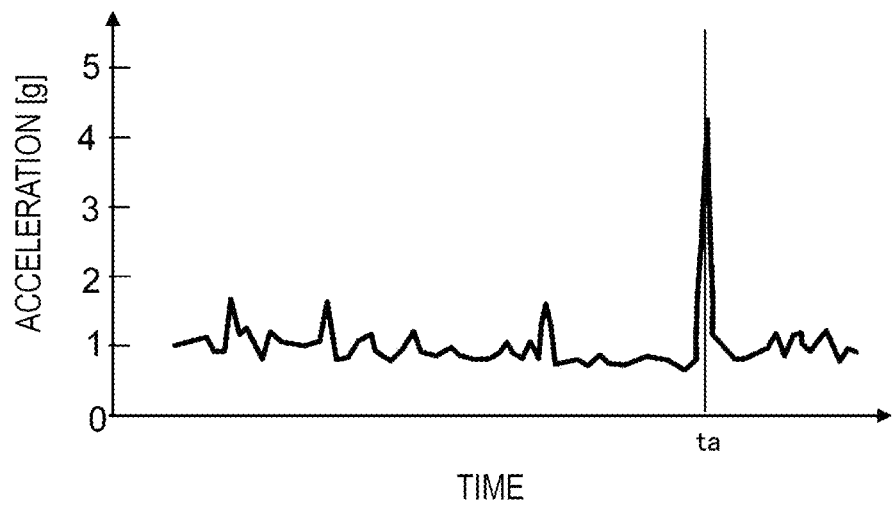
[FIG. 12]
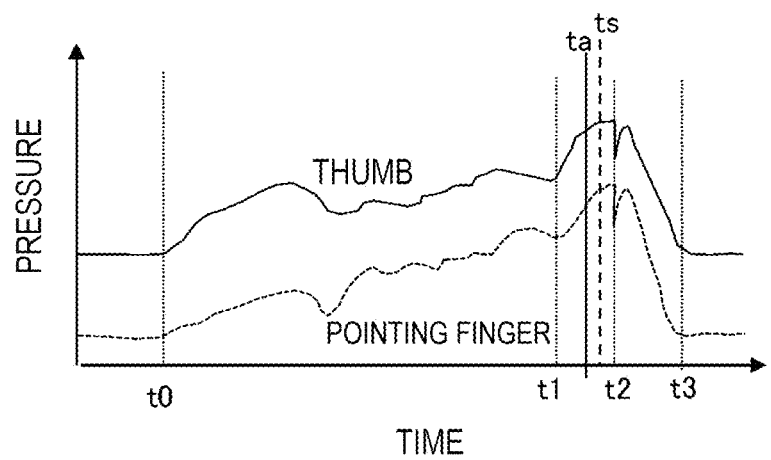

[FIG. 13]
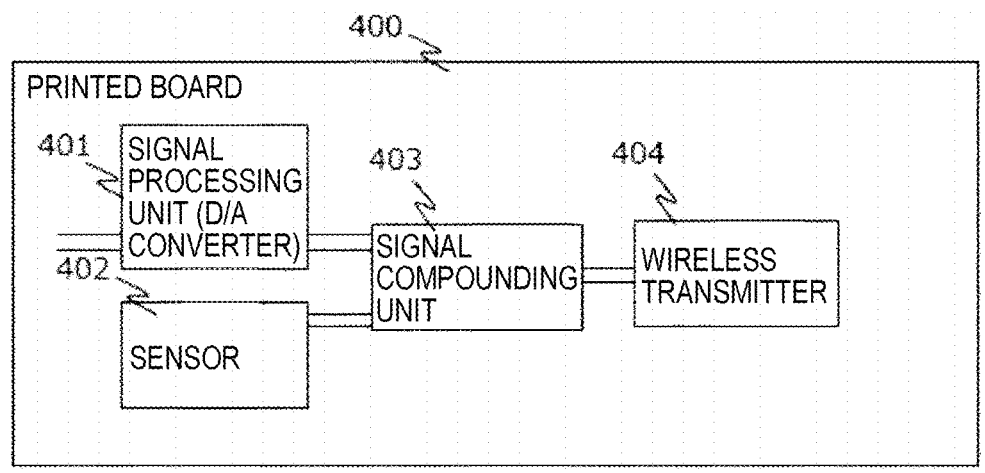

WORK CONTENT DETECTION DETERMINATION DEVICE, WORK CONTENT DETECTION DETERMINATION SYSTEM, AND WEARABLE SENSOR EMBEDDED GLOVE

TECHNICAL FIELD

The present invention relates to a technique of detecting and determining work contents.

BACKGROUND ART

With the progress of internet of things (IoT) and digital technology, sensing of workers at site of manufacturing industry has become popular. By sensing the workers, correctness of work is ensured, and efficiency of the work is improved, so that defects of the work can be reduced.

Examples of work at the site in the manufacturing industry, which has been a problem for many years include connector fitting. The connector used for connecting the electrical wiring is locked by a lock mechanism to be in a fitted state by inserting a male connector into a female connector. Even if the connector is electrically connected, if the connector is in a semi-fitted state where the fitting is mechanically incomplete, the connector may come off due to vibration or the like, to cause a defect. In order to eliminate defects, it is required to check not only the electrical connection but also to examine the mechanical fitting condition.

JP-A-2010-186651 (PTL 1) discloses a device in which a microphone and an acceleration sensor are mounted on a hand of a fitting worker and which determines a fitted state of a connector by using sound information obtained from the microphone and acceleration information obtained from the acceleration sensor. By using both of the sound information and the acceleration information, it is easy to determine fitting at a work site where there are many similar sounds.

CITATION LIST

Patent Literature

PTL 1: JP-A-2010-186651

SUMMARY OF INVENTION

Technical Problem

However, at the work site, workers perform various works and move hands between the works. Here, various much acceleration information is continuously obtained from the acceleration sensors attached to the hands. When the hand collides with an object unexpectedly, unexpected acceleration information is included. When detecting fitting, there are many accelerations similar to those at the time of fitting in such various acceleration information. In combination with many sounds similar to those at the time of fitting in the sound information, even if both the sound information and the acceleration information are used, it is not easy to detect the fitting. The same applies in case of detecting an operation other than fitting.

The present invention has been conceived in view of the above problems, and an object thereof is to detect work contents of a worker with high accuracy.

Solution to Problem

A preferred aspect of the present invention is a work detection determination system including a glove that is worn on a hand of a worker and includes a microphone detecting a work sound of a hand operation in which the hand works on a work target through a contact of the hand with the work target, a pressure sensor detecting a pressure of a work of the hand operation, a motion sensor detecting a motion of the hand operation, and a transmitting unit transmitting a sound signal of the microphone, a pressure signal of the pressure sensor, and a motion signal of the motion sensor; a receiving unit that receives the sound signal, the pressure signal, and the motion signal transmitted from the transmitting unit; a work determination unit that performs detection determination of a work content of the worker by using the sound signal, the pressure signal, and the motion signal; and a notification unit that notifies a determination result of the work determination unit.

Another preferred aspect of the present invention is a wearable sensor embedded glove that is worn on a hand of a worker and observes a hand operation in which the hand works on a work target through a contact of the hand with the work target, the glove including: a microphone that detects a work sound of the work target; a pressure sensor that detects a pressure of a work of the hand operation; a motion sensor that detects a motion of the hand; and a wireless transmitter that wirelessly transmits signals of the microphone, the pressure sensor, and the motion sensor.

With respect to the microphone, the pressure sensor, and the motion sensor, the present embodiment does not prevent a single physical configuration from serving as a plurality of types of microphones or sensors. In such a case, with respect to the sound signal, the pressure signal, and the motion signal, one signal serves as a plurality of signals.

Another preferred aspect of the present invention is a work content detection determination device including a receiving unit that receives at least one signal of a sound signal from a microphone detecting a work sound, a pressure signal from a pressure sensor detecting a pressure of a work of a hand operation, a slip signal detected by the pressure sensor, and an acceleration signal from an acceleration sensor detecting an acceleration of the hand operation, wirelessly transmitted from a wireless transmitter, and a work determination unit that determines a work content of a worker from at least one signal of the sound signal, the pressure signal, the slip signal, and the acceleration signal.

Advantageous Effects of Invention

According to the present invention, the work content of the worker can be detected with high accuracy.

BRIEF DESCRIPTION OF DRAWINGS

FIG. 1 is a block diagram illustrating a configuration of a work content detection determination system according to a first embodiment.

FIG. 2 is a schematic diagram illustrating an appearance of a wearable sensor.

FIG. 3 is a block diagram illustrating details of a work determination unit according to the first embodiment.

FIG. 4 is a flowchart illustrating a work detection determination flow according to the first embodiment.

FIG. 5A is a diagram illustrating a pressure waveform and a sound detection time obtained with a pressure sensor of the wearable sensor when a fitting work is detected.

FIG. 5B is a diagram illustrating a pressure waveform and a sound detection time obtained with the pressure sensor of the wearable sensor when the fitting work is detected.

FIG. 5C is a diagram illustrating a pressure waveform and a sound detection time obtained with the pressure sensor of the wearable sensor when the fitting work is detected.

FIG. 6A is a waveform diagram illustrating a sound waveform obtained with a microphone of the wearable sensor when the fitting work is detected.

FIG. 6B is a waveform diagram illustrating a sound waveform obtained with the microphone of the wearable sensor when the fitting work is detected.

FIG. 7 is a block diagram illustrating a configuration of a work information management system to which a tuning function of the first embodiment is added.

FIG. 8 is a block diagram illustrating a configuration of the work content detection determination system according to a second embodiment.

FIG. 9 is a block diagram illustrating a detail of the work determination unit according to the second embodiment.

FIG. 10 is a flowchart illustrating the work detection determination flow according to the second embodiment.

FIG. 11 is a waveform diagram illustrating an acceleration waveform obtained with an acceleration sensor of the wearable sensor when the fitting work is detected.

FIG. 12 is a waveform diagram illustrating a pressure waveform, a sound detection time, and an acceleration detection time obtained with the pressure sensor of the wearable sensor when the fitting work is detected.

FIG. 13 is a block diagram illustrating an example of IC disposition on a printed board for transmitting data from different sensor by a single radio.

DESCRIPTION OF EMBODIMENTS

Embodiments are described in detail with reference to the drawings. However, the present invention is not construed as being limited to the description of the embodiments shown below. It is easily understood by those skilled in the art that a specific configuration thereof can be changed without departing from the idea or gist of the present invention.

In the configuration of the invention described below, the same reference numerals may be used for the same parts or parts having similar functions in common between different drawings, and duplicate explanations may be omitted.

When there are a plurality of elements with the same or similar functions, the description may be made by applying different subscripts to the same reference numerals. Meanwhile, when a plurality of elements are not required to be distinguished, the description may be made with the subscripts omitted.

The notations such as "first", "second", and "third" in the present specification and the like are applied to identify components, and do not necessarily limit the number, order, or contents thereof. Numbers for identifying the components are used for each context, and a number used in one context do not always indicate the same configuration in the other contexts. The component identified by a certain number is not prevented from serving both as a function of a component identified by another number.

The position, size, shape, area, and the like of each configuration illustrated in the drawings and the like may not represent the actual position, size, shape, area, and the like for easier understanding of the invention. Therefore, the present invention is not necessarily limited to the position, size, shape, area, and the like illustrated in drawings and the like.

The work detection determination system described in the following embodiment uses a glove which is worn on a hand of a worker and includes a microphone that detects a work sound of a hand operation in which the hand works on a work target through a contact of the hand with the work target as a sound signal, a motion sensor that detects the motion of the hand as a motion signal, a pressure sensor that detects a pressure of the work of the hand operation as a pressure signal, and a transmitter that transmits sensing information of the sensors.

Here, the motion of the hand refers to the displacement or deformation of the hand, or the information based thereon. The motion of the hand is indirectly detected by a motion sensor installed on the glove. As the motion sensor, for example, an acceleration sensor is used. As the acceleration sensor, for example, a sensor using a well-known micro electro mechanical systems (MEMS) can be used. Otherwise, the pressure sensor is also used as the motion sensor, and a slip signal is detected based on the pressure signal of the pressure sensor. Here, the slip signal is a signal for detecting the relative displacement between the surface of the hand and the surface of the work target. Otherwise, the motion sensor may be a sensor that optically detects the motion of the hand by using a reflection marker and a light source installed on the surface of the glove.

The system uses the sound signal, the pressure signal, and the motion signal to perform the detection determination of the work content of the worker. In the detection determination, for example, a detection timing of a predetermined work sound based on a sound signal, a detection timing of a predetermined pressure based on the pressure signal, and a detection timing of a predetermined motion based on the motion signal are used to perform determination based on contexts of these timings. The predetermined work sound based on the sound signal is detected, for example, at the timing of the maximum amplitude of the sound signal. When the motion signal is the acceleration signal, the predetermined motion based on the motion signal is detected, for example, at the timing of obtaining the predetermined threshold value or more and the maximum value of the acceleration. When the motion signal is the slip signal, the detection is performed, for example, at the timing when a signal considered to slip by a predetermined value or more is obtained. The detection of the predetermined pressure based on of the pressure signal is executed at the timing of exceeding the predetermined threshold value. Otherwise, the detection is performed based on whether the pressure value is in a period transitioning with a predetermined pattern. Since the process of the pressure signal has the smallest load from the relationship of the frequency of the signal, the work may be determined, for example, by first determining whether the pressure value is in the period transitioning with a predetermined pattern and checking the relationship between the timings of the sound signals and the motion signals in the period.

Hereinafter, embodiments of the work content detection determination system and the wearable sensor according to the present invention are specifically described with reference to the drawings. As the work content, a fitting work is exemplified.

EXAMPLE 1

With reference to FIGS. 1 to 8, a work content detection determination system according to a first embodiment is described.

<Basic Configuration>

FIG. 1 illustrates a configuration diagram of a work content detection determination system 100 according to the first embodiment. The work content detection determination system 100 is configured with a wearable sensor 101 that a worker wears on the body and a work content detection determination computer 102 that processes data collected with the wearable sensor.

The wearable sensor 101 includes a microphone 103, a pressure sensor 104 (also serves as a slip sensor), and a wireless transmitting unit 105. While working, the worker mounts the wearable sensor 101 on the hand, collects sound data during the work with the microphone 103 and pressure data during the work with the pressure sensor 104, and wirelessly transmits the data with the wireless transmitting unit 105. The transmission may not be wireless transmission but be wired transmission.

The work content detection determination computer 102 includes a wireless receiving unit 106, a work determination unit 107, and a notification unit 108. The sound data and the pressure data wirelessly sent from the wearable sensor 101 are received by the wireless receiving unit 106, the process of the detection determination is performed on the received data with the work determination unit 107 to determine the fitted state, and the determined result is reported to the worker with the notification unit 108.

If the notification unit 108 has a function of notifying the determination result of the work determination unit 107, the notification may be performed, for example, by the display only with visual information or by a combination of auditory and tactile information such as sound and vibration. For example, the notification unit 108 may be configured as a feedback unit that reports the information from the work determination unit 107 to the worker or a work manager, as visual, auditory, and tactile information. The determined result is reported to the worker in real time, the worker can immediately redo or correct the work on the spot.

The work content detection determination computer 102 can also be configured with, for example, a well-known personal computer or portable information terminal including an input device, an output device, a processing device, and a storage device. Here, functions such as calculation and control are realized by incorporating a predetermined process with other hardware by executing the program stored in the storage device by the processing device. A program executed by a computer or the like, a function thereof, or means for realizing the function may be referred to as a "function", "means", a "part", a "unit", a "module", or the like. The same functions as those configured by software can be realized by hardware such as a field programmable gate array (FPGA) and an application specific integrated circuit (ASIC).

FIG. 2 illustrates an appearance diagram of the wearable sensor 101. The wearable sensor 101 seen from the inside, that is, the palm side, is illustrated on the left, and the wearable sensor 101 seen from the outside, that is, the back side of the hand, is illustrated on the right. The wearable sensor 101 has a glove type. The wearable sensor 101 of FIG. 2 includes five fingers, but may include, for example, fingers at least including a microphone or a pressure sensor such as two of a thumb and a pointing finger.

The wearable sensor 101 may be directly mounted on a hand or may be mounted on a work glove. The wearable sensor 101 includes a thumb microphone 103A on the thumb of the back side of the hand, a wrist microphone 103B on the wrist side of the back of the hand, a thumb pressure sensor 104A on the thumb of the palm side of the hand, a pointing finger pressure sensor 104B on the pointing finger of the palm side of the hand, and a wireless transmitting unit 105A on the back of the hand. The microphones 103A and 103B and the pressure sensors 104A and 104B are connected to the wireless transmitting unit 105A by a conductive thread or a conducting wire. The wireless transmitting unit 105A transmits data by wireless communication but may transmit data by wire in some cases.

The wearable sensor 101 of FIG. 2 includes two microphones. The number of the microphones may be one or more, and is preferably two or more, because the direction of the sound source can be known to be capable of distinguishing whether the sound is a sound from a fingertip. The larger the number of microphones, the easier the detection accuracy is improved. However, the number of wireless transmission channels and the amount of data processing increase, so that the cost increases accordingly. When the number of microphones is two or more, one is disposed near a position where the sound to be detected is generated, and the other is disposed far from the position where the sound to be detected is generated. As such, ratios of the loudness and time differences of the sounds to be detected that are captured by the two microphones become larger, so that the sound to be detected is distinguished more easily. The two microphones are not preferably placed at positions such as the thumb and the pointing finger where the positional relationship changes depending on the operation of the fingers. The microphones may be disposed at positions where the sound to be detected is not blocked during the work. When the fitting sound is detected, the two microphones are desirably disposed on the thumb and the wrist.

The wearable sensor 101 of FIG. 2 includes two pressure sensors. The pressure sensors are attached to positions where pressures are applied by a work to be detected. The position is not necessarily a finger and may be a palm. The number thereof may be one or more, but the larger, the more data to be used for detection increases, so that the accuracy of the detection increases. When a large number of pressure sensors are used, one pressure sensor may be attached to a position to which a pressure is not applied during the target work, but a pressure is applied during a work that is likely to be erroneously detected. The fitting is performed by holding a connector with the thumb and the pointing finger, and thus pressure sensors desirably are attached to the thumb and the pointing finger. As the pressure sensor, a sheet-like sensor made of rubber or cloth including conductive particles is used. The area is set to sufficiently cover the area to which a pressure is applied during the target work. A pressure sensor that can detect slippage between the pressure sensor and the object is used. As described below, the accuracy of detection can be improved by detecting slippage.

Details of the work determination unit 107 illustrated in FIG. 1 are described by using FIGS. 3 and 4.

FIG. 3 illustrates a configuration diagram of the work content detection determination computer 102 illustrating details of the work determination unit 107 according to the first embodiment. The work determination unit 107 includes a sound data storage processing unit 111 and a sound data accumulation unit 112 that store sound data, a pressure detection unit 113 and a pressure detection result accumulation unit 114 that detect pressures, a sound detection unit 115 and a sound detection result accumulation unit 116 that detect sounds, a work detection unit 117 and a work detection result accumulation unit 118 that detect works, a work quality determination unit 119, a work log accumulation unit 120, and a work information database 121 that determine work qualities, and a feature amount condition accumulation unit 122 that accumulates feature amount extraction conditions and determination conditions for each detection and determination.

FIG. 4 illustrates a work detection determination flow performed by the work determination unit 107 illustrated in FIG. 3. In the work detection determination flow, two of a sound storage program 131 and a work determination program 132 are separately performed. The work sound starting from the fitting sound includes components up to the high frequency range in many cases, and thus it is desirable to sample the sound data at a high frequency of, for example, 40 kHz or higher for processing with high accuracy. The other pressure is the motion of the hand of a human, and thus a low sampling frequency is sufficient. The pressure data is sampled at a frequency of, for example, about 100 Hz. Therefore, the data amount of the sound data is larger than the pressure data also in the number of digits. Since the processing of the sound data with a large data amount takes a lot of time, the load of the computer increases, and also the detection process in real time becomes difficult. If the detection process cannot be performed in real time, the result is not reported to the worker immediately, and the work cannot be redone or corrected on the spot. Therefore, the sound data is processed in advance in the sound storage program 131 separately from the work determination program 132. As described below, in the present example, the determination process is performed in the order of the pressure data and the sound data in ascending order of sampling frequency.

In the sound storage program 131, the sound data storage processing unit 111 collects the sound data received by the wireless receiving unit 106 in the sound data accumulation unit 112 (S1). If the maximum value of the amplitude of the sound data is larger than the value set in the feature amount condition accumulation unit 122 in advance (S2), the sound detection unit 115 stores the sound data in the sound detection result accumulation unit 116 (S3). The time of the stored sound data is set to time required for the sound detection, for example, 0.2 seconds. In S2, other than the maximum value of the amplitude, another feature amount of the sound detection, for example, a predetermined frequency may be used.

The work determination program 132 collects the pressure data received by the wireless receiving unit 106 with the pressure detection unit 113 (S4), and performs the pressure detection process by using feature amount extraction conditions and determination conditions of the pressure in the feature amount condition accumulation unit 122 (S5). The feature amount extraction conditions and determination conditions of the pressure are, for example, patterns of the temporal change of the pressure signal or the pressure value exceeding the predetermined threshold value. If the pressure of the target work is detected (S6), the detection result is stored in the pressure detection result accumulation unit 114. If the pressure is detected, the sound detection unit 115 checks whether the sound data at the time closed to the detected pressure is in the sound detection result accumulation unit 116 (S7). If there is sound data, the sound data is collected from the sound detection result accumulation unit 116 (S8) to perform the sound detection process (S9). In the sound detection process, for example, the timing of the maximum amplitude of the sound signal is detected.

When the sound of the target work is detected (S10), the detection result is stored in the sound detection result accumulation unit 116. When the sound is detected (S10), the work detection unit 117 determines the work by using the pressure detection result stored in the pressure detection result accumulation unit 114 and the sound detection result stored in the sound detection result accumulation unit 116 (S11). The work determination is performed, for example, based on the pattern of the pressure signal and the relationship of the timings of the sound signals.

When the detection result is determined as the target work (S12), the detection result is stored in the work detection result accumulation unit 118. When the detection result is determined as the target work (S12), the work quality determination unit 119 determines the quality whether the target work is correctly performed by using the pressure detection result stored in the pressure detection result accumulation unit 114 and the sound detection result stored in the sound detection result accumulation unit 116 (S13). The result is stored in the work log accumulation unit 120 in association with the work data of the work information database 121 in which the work information is registered in advance and is output to the notification unit 108 (S14). The work information database 121 is not necessarily required, and if there is no work information database, the result is stored in the work log accumulation unit 120 without change and is output to the notification unit 108 (S14).

In the work determination unit 107 and the data determination flow, by using the sound storage program 131, a process of storing the sound data can be reduced, and also an access to the sound data accumulation unit 112 can be reduced. Only when the pressure of the target work is detected by the work determination program 132, the sound data is extracted from the sound data accumulation unit 112, and the sound data process is performed. Therefore, a sound accidently generated is not processed. The access to the sound data accumulation unit 112 can also be reduced, and thus it is not required to always perform the sound detection process.

Accordingly, the process of the sound with a large data amount is reduced, and thus the access to the data accumulation unit which takes a lot of time can be reduced. As a result, time required for the data process is shortened, and thus the detection in real time becomes easy, so that the load of the computer can be reduced. If the load of the computer can be reduced, the system can be made cheaper with an inexpensive computer, and a plurality of workers can perform detection with one computer. Since the detection determination can be performed in real time, the worker can redo or correct the work immediately without decreasing the work efficiency. The storage data amount of the sound data can be reduced, and the capacity of the accumulation unit can be reduced, so that the system can be made cheaper.

The work detection determination flow illustrated in FIG. 4 is an example, and the present invention is not necessarily required to follow the flow. If the processing performance of the computer is sufficiently high or real-time detection is not required, two of the sound storage program 131 and the work determination program 132 are not executed separately but executed as one program. Prior to the pressure detection, the sound detection may be performed.

Subsequently, the work detection determination is described with reference to FIGS. 3 and 4 by using the waveforms of the sensor data during the fitting work illustrated in FIGS. 5A to 5C and FIGS. 6A and 6B.

FIGS. 5A, 5B, and 5C are pressure waveforms obtained from the pressure sensor 104 of the wearable sensor 101 detected as the fitting work. FIGS. 5A, 5B, and 5C are pressure waveforms when different workers work, the pressure waveform obtained by the thumb pressure sensor 104A is illustrated with a solid line A, and the pressure waveform obtained by the pointing finger pressure sensor 104B is illustrated with a broken line B. The pressure waveforms of the thumb and the pointing finger are illustrated by shifting the vertical axis so as not to be overlapped. As described below, the time when the amplitude of the fitting sound becomes the maximum is illustrated as ts.

A series of fitting operations and the pressure change in such a case are described by using the pressure waveform of a worker A of FIG. 5A. First, during the period of time until a time t0, a state in which the pressure is small continues. It is before the fitting operation, and nothing is grabbed by a glove-type wearable sensor. From the time t0, the pressure increases. From here, the worker grabs the connector with the thumb and the pointing finger of the glove-type wearable sensor and starts the fitting operation. During the period of time between a time t1 and a time t3, there is a mountain of the pressure, and the pressure suddenly decreases at a time t2 therebetween. The pressure between the time t1 and the time t3 is the period of the mountain, and the worker strongly grabs the connector with the thumb and the pointing finger and inserts the connector. Then, at the time t2, the connector is completely inserted (fitting end point).

In the pressure sensitive sheet-type pressure sensor including the conductive particle, if the pressure is applied, the conductive particles are in contact with each other, a path where the current easily flows is generated, the resistance decreases, and the sensor senses that the pressure is high. With respect to the pressure sensor of this type, if a force is applied in a direction perpendicular to the pressure, that is, in the direction of slippage, the current path formed by the conductive particles are suddenly broken, and the resistance increases, so that the pressure appears to decrease (see Patent Document "JP-A-2010-271242"). At the time t2, the pressure suddenly decreases, because the pressure sensor senses the slippage, and thus the decrease indicates that the insertion of the connector is completed, and slippage is generated between the connector and the pressure sensor due to the momentum of insertion. After the time t3, a state in which the pressure is small continues. Here, the worker releases the finger from the connector, and the fitting operation is completed. Accordingly, the detection signal sent from the pressure sensitive conductive sheet is received, the pressure is detected from the resistance value of the pressure sensitive conductive sheet, the slippage detection signal can be generated based on the change of the resistance value of the pressure sensitive conductive sheet.

The pressure waveform of a worker B of FIG. 5B and the pressure waveform of a worker C of FIG. 5C are also basically the same as that of the worker A. The difference of the worker B is that the mountain of the waveform of the pressure between the time t1 and the time t3 is small. It means that the worker B inserts the connector with a less force on the finger. The difference of the worker C is that there is another mountain of the pressure after the time t3 during the time between the time t3 and a time t5 and the pressure suddenly decreases again at a time t4. It means that the worker C performs an operation of pushing the connector again in order to check the fitted state.

In the pressure detection process (S5) of FIG. 4, as shown in the pressure waveform of the fitting operation above, when there is a pressure waveform including at least one feature of (1) the pressure is large before the fitting end point, (2) a state in which pressure is small continues after the fitting end point, (3) there is slippage before a certain period of time from the fitting end point, and (4) a similar change occurs on the thumb and the pointing finger, the pressure is detected as the pressure of the fitting operation.

In the pressure detection process (S5) of determining whether to perform subsequent processes, the fitting endpoint is not yet specified, but for example, that the pressure transitions to a pattern including the above timings (1), (2), and (4) is detected. The timing of the signal of the motion (slippage) of (3) may be included. The feature that there is slippage before a certain period of time from the fitting end point is the feature to be obtained by using the pressure sensor that can detect the slippage, and it becomes easy to distinguish the other works that do not cause a lot of slippage from the fitting work, so that erroneous detection can be reduced. In contrary, the simplest example may be only detecting that the worker grabs an object with fingers. Here, only whether the pressure exceeds the predetermined threshold value may be determined as the pressure detection.

FIGS. 6A and 6B are sound waveforms obtained by the microphone 103 of the wearable sensor 101 when the fitting work is detected. FIG. 6A is a sound waveform of the thumb microphone 103A, and FIG. 6B is a sound waveform of the wrist microphone 103B. Unlike the pressure waveforms illustrated in FIGS. 5A to 5B, difference between the sound waveforms of the workers is small.

In the sound waveform of the thumb microphone of FIG. 6A, if the time when the amplitude becomes the maximum is set to ts, the amplitude of the sound suddenly increases before that, then attenuates slower than the increase, and disappears. In the sound waveform of the wrist microphone of FIG. 6B, the amplitude becomes the maximum later than the time ts when the amplitude of the thumb microphone becomes the maximum. The maximum value of the amplitude of the wrist microphone is smaller than the maximum value of the amplitude of the thumb microphone. The position where the fitting sound is generated is the tip of the thumb, and the thumb microphone is closer than the wrist microphone from the position where the fitting sound is generated. Therefore, a larger sound reaches the thumb microphone faster.

In the sound detection process (S9) of FIG. 4, as shown in the sound waveform in case of fitting as above, when there is a sound waveform including a feature such as (1) the amplitude is larger than the predetermined threshold value, (2) a speed of the increases or the attenuation of the amplitude is close to the waveform of the fitting sound, (3) the amplitude of the thumb microphone is larger than the amplitude of the wrist microphone, and (4) the sound reaches the thumb microphone faster than the wrist microphone, the sound is detected as the sound of the fitting operation.

In the work determination (S11) of FIG. 4, in addition to the detection of both the pressure and the sound of the fitting in the pressure detection process (S5) and the sound detection process (S9), the matching of the time of the pressure detection and the time of the sound detection is considered. In the pressure waveform of FIG. 5, the time indicated by ts is the time when the amplitude of the fitting sound is the maximum. While the connector is grabbed with the thumb and the pointing finger and inserted, the lock mechanism of the connector works to generate the fitting sound, and the connector reaches the back immediately thereafter. That is, there is the slip time t2 of the fitting pressure immediately after the time ts of the fitting sound (specifically, within the predetermined time). The fitting work is detected considering this as the condition (S11). That is, in the work determination (S11), basically, the temporal relationship between the timing of the signal of the sound and the timing of the signal of the motion (slippage) are determined. The determination may be performed based on the pressure value described in the process S4 and the change pattern of the pressure value. Specifically, the determination may be performed based on the relationship between the timing of the signal of the sound or the motion (slippage) and the temporal change patterns of the pressure described with reference to FIGS. 5A to 5C or the detection timing of the predetermined pressure. Obviously, when the same determination is performed on the pressure signal in the process S4, it is not necessary to perform the determination again.

When the pressure sensor cannot detect the slip signal, it is considered to use the time of the peak of the mountain of the pressure for inserting the connector, as the time of the fitting pressure. However, the time when the strongest force is applied to the finger during insertion is not clear at all, and the time is not exactly determined. However, the time when the strongest force is applied to the finger during the connector insertion may differ even by workers. Unlike the time of the slippage, the time of the peak of the mountain of the pressure becomes indistinctive when the mountain is gentle or there is a flat area at the top of the mountain, for example, when the connector is grabbed and inserted with a less force on the thumb and the pointing finger like the worker B of FIG. 5B. When the time of the fitting pressure is indistinctive, the temporal relationship of the time of the fitting pressure and the time of the fitting sound is not always the same, and the accuracy of the detection decreases. In contrast, when the time of the slippage is used, the time in the graph is clearly determined and is determined by the time when the connector reaches the back during the insertion. Therefore, the temporal relationship of the time of the fitting pressure and the time of the fitting sound is always clearly determined, so that the accuracy of the work detection (S11) can be increased.

In the work quality determination (S13) of FIG. 4, it is determined whether a work standard determined in advance is satisfied. For example, in case of the fitting work, after the insertion of the connector, in order to check whether the connector is in the fitted state, a checking operation of pulling once and pushing again the connector is set as a work standard. In case of the worker C of FIG. 5C, as described above, there is another mountain of the pressure during the period of time between the time t3 and the time t5, the pressure suddenly decreases again at the time t4. Here, the worker C performs the checking operation of pulling once and pushing again the connector in order to check whether the connector is in the fitted state. After the slip signal at the time t2 immediately after the time is of the fitting sound, there is another slip signal to know that the checking operation is performed. At the works of the workers A and B of FIGS. 5A and 5B, there is no slip signal after the slip signal at the time t2 immediately after the time is of the fitting sound. Therefore, it is known that the checking operation is not performed. As such, in the work quality determination (S13), it is determined that the work of FIG. 5C satisfies the work standard, and the works of FIGS. 5A and 5B do not satisfy the work standard. Here, by using the slip signal, the checking operation can be more clearly determined.

If it is not required to determine the work quality, and it is sufficient to detect that the work is performed, the work quality determination (S13) is unnecessary. By the work detection (S11), if it can be determined that the work is correctly performed, for example, during fitting, when it is possible to determine that the fitting is correctly performed by a fitting sound, the work quality determination (S13) is unnecessary. Here, in the configuration of the work determination unit 107 of FIG. 3, the work quality determination unit 119 and the work log accumulation unit 120 are unnecessary, and the result of the work detection unit 117 may be directly output to the notification unit 108. In the data determination flow of FIG. 4, the work quality determination (S13) is not performed, and the result of the work detection (S11) may be output to the notification unit 108 (S14).

<Example in which Tuning Function is Added>

Subsequently, a work information management system to which the tuning function is added is described with reference to FIG. 7. As illustrated in FIG. 5, the pressure data of the fingertip which is obtained by the wearable sensor 101 may differ depending on the size of the force by the worker, the method of applying the force, and the method of the work. Therefore, by tuning the detection condition for each worker with the work information management system to which the tuning function is added, the detection accuracy can be improved. It is also effective when applied to a new factory or a work line.

FIG. 7 illustrates a configuration diagram of a work content detection determination computer 102' to which the tuning function is added. In addition to the work content detection determination computer 102 of FIG. 3, a tuning unit 141 is included. The tuning unit 141 includes a work information input unit 142, a positive detection feature amount accumulation unit 143, and a feature amount condition tuning unit 144. As the work information input unit 142, for example, the microphone 103 and the pressure sensor 104 of the glove-type wearable sensor 101, a keyboard of the work content detection determination computer 102, and the like are used.

Before each worker uses the work information management system for the first time, the wearable sensor 101 is mounted, and a work for tuning is performed by using the tuning function. In the work for tuning, when performing a work to be detected, the worker gives an input signal to the work information input unit 142. If a microphone is used as the work information input unit 142, immediately after the work to be detected is performed, the voice determined in advance is input to the microphone. If a pressure sensor is used as the work information input unit 142, immediately after the work to be detected is performed, a pressure signal determined in advance is input to the pressure sensor. If a keyboard is used as the work information input unit 142, immediately after the work to be detected is performed, a signal is input by pushing the keyboard. By the input of the signal to the work information input unit 142, the system can detect that the work to be detected is performed.

First, if the work to be detected is performed, each detection unit of the work determination unit 107 performs the detection and determination processes, and if the detection condition is satisfied, the detection result is stored in the accumulation unit of each detection result (the pressure detection result accumulation unit 114, the sound detection result accumulation unit 116, the work detection result accumulation unit 118, and the work log accumulation unit 120). The detection result includes a feature amount used in the detection together with the time of the detection.

Subsequently, immediately after the work to be detected is performed, if the input signal is given to the work information input unit 142, a detection result immediately before the time when the input signal is given is searched from the pressure detection result accumulation unit 114, and is moved to the positive detection feature amount accumulation unit 143. Here, if there is no detection result in the pressure detection result accumulation unit 114 due to detection omission, when the detection condition is tuned, the tuning is not performed so that the detection is performed. Therefore, the detection condition is firstly loosened so that there is no omission in detection. If there is omission in detection, the detection condition is changed to be loosened.

If the detection results of the work to be detected are accumulated in the positive detection feature amount accumulation unit 143, the feature amount condition tuning unit 144 changes the detection condition of the feature amount to become stricter by using the distribution of the accumulated feature amounts. Since the distribution of the feature amount is different depending on the workers, the detection conditions are different for each worker. If the detection condition is changed, the detection results of the work to be detected are accumulated in the positive detection feature amount accumulation unit 143, and the detection condition of the feature amount is changed to be stricter by using the distribution of the accumulated feature amount. The tuning is repeated until the erroneous detection rate and the detection omission rate from the accumulation information of the pressure detection result accumulation unit 114 and the positive detection feature amount accumulation unit 143 are below the preset settings.

With respect to the pressure detection, as described with reference to FIG. 5, pressure waveforms are different depending on the workers, and thus the extracted feature amounts become different. Therefore, the detection accuracy can be increased by tuning the detection conditions for each worker and recording the detection conditions in the feature amount condition accumulation unit 122. That is, the erroneous detection rate and the detection omission rate can be decreased. The present tuning function can be applied not only to the pressure detection but also to the sound detection, work detection, work quality determination in the same manner. Therefore, the detection accuracy can be further increased.

By using the work content detection determination computer 102' to which the tuning function is added as illustrated in FIG. 7, the tuning is performed only by performing a tuning work. The tuning for each worker can be easily performed. The application to a new factory or a line can be easily performed.

EXAMPLE 2

With reference to FIGS. 8 to 11, the work information management system according to a second embodiment is described.

FIG. 8 illustrates a configuration diagram of a work content detection determination system 100B according to the second embodiment. The difference from the work content detection determination system 100 according to the first embodiment is to include an acceleration sensor 151. As the acceleration sensor 151, a three-axis acceleration sensor is used. A wireless transmitting unit 105B and a wireless receiving unit 106B transmit and receive data of the acceleration sensor 151 in addition to the data of the microphone 103 and the pressure sensor 104.

A work determination unit 107B performs the detection and determination by using data of the acceleration sensor 151, in addition to the data of the microphone 103 and the pressure sensor 104. As the wearable sensor 101B, a sensor obtained by attaching the acceleration sensor 151 to the wearable sensor 101 illustrated in FIG. 2 is used. The acceleration sensor 151 may be attached to the same position as the wireless transmitting unit 105A of the wearable sensor 101B on the back of the hand. By attaching the sensor to the position, wiring to the wireless transmitting unit 105A can be shortened.

With reference to FIGS. 9 and 10, details of the work determination unit 107B illustrated in FIG. 8 are described.

FIG. 9 illustrates a configuration diagram of a work content detection determination computer 102B showing the detailed configuration of the work determination unit 107B according to the second embodiment. Compared with the work determination unit 107 according to the first embodiment illustrated in FIG. 3, the work determination unit 107B newly includes an acceleration detection unit 152 and an acceleration detection result accumulation unit 153 that detect acceleration.

FIG. 10 illustrates a data determination flow performed by the work determination unit 107B illustrated in FIG. 9. In the data determination flow according to the first embodiment illustrated in FIG. 4, the sound storage program 131 is the same. In a work determination program 132B, collection, a detection process, and determination of the acceleration are newly performed (S15 to 17). The sampling frequency of the acceleration data may be about 1 kHz. The frequency is not required to be as high as that of the sound data, but data of a shorter period of time than the pressure data is required, and thus the frequency becomes a high frequency. That is, the pressure data, the acceleration data, and the sound data are obtained in ascending order of the sampling frequency. In order to simply obtain the data, the sampling frequency of the pressure data may be increased to be the same as the sampling frequency of the acceleration data.

The work determination program 132B performs the detection processes in ascending order of the sampling frequency. In the same manner as the work determination program 132 according to the first embodiment, the pressure detection process is performed (S5). When the pressure is detected (S6), the acceleration detection unit 152 collects the acceleration data at a time close to the detected pressure from the wireless receiving unit 106B (S15), and performs the acceleration detection process (S16). When the acceleration of the target work is detected (S17), the detection result is stored in the acceleration detection result accumulation unit 153. When the acceleration is detected, in the same manner as the work determination program 132 according to the first embodiment, the sound detection, work determination, and work quality determination are performed, and when the work determination of the target work is performed, the acceleration is output to the notification unit 108. In case of work determination (S5), determination is performed by using the acceleration detection result in addition to the pressure detection result and the sound detection result.

The fact that the work determination program 132B performs the detection process of a plurality of kinds of sensor data in ascending order of the sampling frequency means that processes are performed from a detection process that requires less processing performances of the computer. By first performing the detection process that requires less processing performances of the computer, when detection is not performed in the previous process, the subsequent detection process that requires more processing performances of the computer does not have to be performed, and thus the load of the computer can be reduced. As a result, the detection in real time becomes easy, and thus the system can be made cheaper with an inexpensive computer, and a plurality of workers can perform detection with one computer.

The work detection determination flow illustrated in FIG. 10 is an example, and the present invention is not necessarily required to follow the flow. The acceleration detection process may be performed before the pressure detection process, and the pressure detection process and the acceleration detection process are performed at the same time. When the processing performances of the computer are sufficiently high, and the real-time detection is unnecessary, two of the sound storage program 131 and the work determination program 132 are not executed separately but executed as one program.

With reference to the waveforms of the sensor data when the fitting work is detected illustrated in FIGS. 11 and 12, the detection performed in the detection flow illustrated in FIG. 10 is described.

FIG. 11 is an acceleration waveform obtained from the acceleration sensor 151 of the wearable sensor 101 when the fitting work is detected. Absolute values of the acceleration of the three axes are shown as a waveform. The acceleration takes a value of 1 g of the gravitational acceleration when the hand does not move, and usually moves up and down around 1 g when the hand moves during a work. In FIG. 11, the acceleration suddenly increases at a time ta. Here, the worker inserts the connector. When the connector is inserted, the hand moves quickly, and thus the acceleration becomes a large value momentarily. By capturing a large acceleration, the acceleration waveform of the fitting operation can be detected. However, since many similar waveforms appear during the work, it is difficult to determine the fitting operation only from the acceleration waveform.

In the work detection (S11) of FIG. 10, in addition to all of the pressure, the acceleration, and the sound of the fitting are detected by the pressure detection process (S5), the acceleration detection process (S16), and the sound detection process (S9), the relationship between the time of the pressure detection, the time of the acceleration detection, and the time of the sound detection are considered. FIG. 12 illustrates a pressure waveform of the fitting operation. The time ta and the time ts are times when the acceleration and the amplitude of the sound are the maximum, that is, the time of the acceleration detection and the time of the sound detection. Here, the times are shown in an order of the time ta of the acceleration detection, the time ts of the sound detection, and the slip time t2 of the fitting pressure. When inserting the connector, the connector is grabbed with the thumb and the pointing finger, the hand vigorously moves in the insertion direction, and the acceleration becomes the maximum value at the time ta. Subsequently, if the connector is inserted, the locking mechanism works to generate a fitting sound, and the amplitude of the sound becomes the maximum value at time ts. Thereafter, the connector reaches the back and pressure slip occurs at the time t2. In the condition that the time ta, the time ts, and the time t2 are arranged in order within a certain period of time, the fitting work is detected (S11). The time within a certain period of time is set to a time, for example, within 0.1 seconds.

With respect to the timing when the acceleration becomes the maximum by a worker or a work, in some other cases, the time ta may come after the time ts. In such a case, the fitting work is detected in a condition that both of the time ta and the time ts are before a certain period of time from the time t2.

In the above description, the slip signal time t2 is used, but even if the slip signal time t2 is omitted, and the relationship between the time of the acceleration detection, the time of the sound detection, and the detection timing of the pressure signal are used, the increase of the detection accuracy of the work to a certain degree can be expected. As described with reference to FIGS. 5A to 5C, the pressure signal during the work shows a unique pattern, and the relationship between the time of the acceleration detection and the time of the sound detection are characteristic.

By using the acceleration time described above, erroneous detection can be reduced, and the detection accuracy can be increased. It is effective when a sufficiently high detection accuracy is required. The tuning function described in the first embodiment can be similarly applied to the second embodiment.

EXAMPLE 3

The wireless data transmission from the wireless transmitting unit 105 to the wireless receiving unit 106 is described with reference to FIG. 13.

As described with reference to FIG. 4, a temporal relationship between the time ts of the fitting sound and the slip time t2 of the fitting pressure are used for the work determination. The sound data and the pressure data are wirelessly transmitted from the wearable sensor 101 to the work content detection determination computer 102. However, if the synchronization of the time between the sound data and the pressure data shifts, determination cannot be correctly performed.

In order to prevent such a time synchronization shift between a plurality of sensor signals, the plurality of sensor signals are bundled into a composite signal, and the bundled signal is transmitted and received as a single wireless signal.

As an example of the method, as illustrated in FIG. 7, signals from a plurality of sensors 401 and 402 disposed on a printed board are once sent to a signal compounding unit 403, and the signals are compounded, and then transmitted from a wireless transmitter 404. Here, the signal compounding unit 403 may be disposed as a single IC chip as illustrated in FIG. 7.

For example, a plurality of signals are sent to the IC of the wireless transmitting unit 105 through an electric signal on the wiring and then bundled to become a single wireless signal in an internal circuit. Then, with the time information, time is assigned to data in the wireless transmitting unit 105, the wireless receiving unit 106, or the work determination unit 107, and then the operation is collated after decomposition into each sensing signal.

By eliminating the time synchronization shift between the plurality of sensors, the work information of the worker is specified with high accuracy, so that the work can be determined.

In addition to the fitting work, the work content detection determination system 100 of the examples described above can be applied in the same manner, if a work includes a work content that can be detected with information of a sound and a pressure applied to a hand or information of a sound, a pressure applied to a hand, and an acceleration of the hand. Not only one work but also a plurality of works can be separately detected by providing detection conditions and determination conditions, respectively. It is also possible to detect a plurality of works and record work contents in chronological order. Therefore, it becomes easy to make the work more efficient.

A work is detected with information of a sound and a pressure applied to a hand or information of a sound, a pressure applied to a hand, and sensor information of an acceleration of a hand by the work content detection determination system 100 described above, but sensor information other than the above may be used. By using more sensor information, the detection accuracy can be further improved.

In the above embodiments, a work by a worker is exemplified, but the application of the present invention is not necessarily limited to a work by a worker.

In the above embodiments, a work of the hand is exemplified, but the wearable sensor included in the present invention is not limited thereto and may be a sensor mounted to a part of the foot such as the sole of the foot and the knee, and a part of the arm such as the shoulder and the elbow.

In the above embodiments, the description as a wearable sensor is made, the present invention is not limited to a sensor worn by a person and may be a robot or an assembly machine equipped with a plurality of sensors.

As described above, the work content detection determination system and the wearable sensor capable of detecting work contents of a worker with high accuracy, particularly capable of detecting the connector fitting with high accuracy can be provided by the technique described in the examples.

REFERENCE SIGNS LIST 100, 100B: work content detection determination system
101: wearable sensor
102, 102', 102B: work content detection determination computer
103, 103A, 103B: microphone
104, 104A, 104B: pressure sensor
105, 105A, 105B: wireless transmitting unit 106, 106B wireless receiving unit 106, 106B: wireless receiving unit
107, 107B: work determination unit
108: notification unit
111: sound data storage processing unit
112: sound data accumulation unit
113: pressure detection unit
114: pressure detection result accumulation unit
115: sound detection unit
116: sound detection result accumulation unit
117: work detection unit
118: work detection result accumulation unit
119: work quality determination unit
120: work log accumulation unit
121: work information database
122: feature amount condition accumulation unit
131: sound storage program
132, 132B: work determination program
141: tuning unit
142: work information input unit
143: positive detection feature amount accumulation unit
144: feature amount condition tuning unit
151: acceleration sensor
152: acceleration detection unit
153: acceleration detection result accumulation unit
401, 402: sensor
403: signal compounding unit
404: wireless transmitter

The invention claimed is:

1. A work content detection determination system comprising:
   a glove that is worn on a hand of a worker, the glove comprising:
      a microphone detecting a work sound of a hand operation in which the hand works on a work target through a contact of the hand with the work target,
      a pressure sensor detecting a pressure of a work of the hand operation,
      a motion sensor detecting a motion of the hand operation, and
      a wireless transmitter transmitting a sound signal of the microphone, a pressure signal of the pressure sensor, and a motion signal of the motion sensor; and
   a computer configured to:
      receive the sound signal, the pressure signal, and the motion signal transmitted from the wireless transmitter of the glove;
      detect a slip signal based on a change in the pressure signal;
      determine a work content of the worker by using the sound signal, the pressure signal, and the motion signal, the work content determined further based on a difference between a detection timing of a predetermined work sound detected in the sound signal and a detection timing of the slip signal satisfying a threshold; and
      generate a notification for display that indicates the work content of the worker.

2. The work content detection determination system according to claim 1, wherein the computer is further configured to:
   determine the work content by using a detection timing of a predetermined work sound detected in the sound signal, a detection timing of a predetermined pressure detected in the pressure signal, and a detection timing of a predetermined motion detected in the motion signal.

3. The work content detection determination system according to claim 2, wherein the computer is further configured to:
   detect the predetermined work sound in the sound signal using the pressure signal.

4. The work content detection determination system according to claim 1, wherein the microphone is first microphone and the glove further comprises a second microphone, the first microphone attached to a first location close to a place where the work sound is generated, the second microphone attached to a second location farther from the place where work sound is generated than the first location.

5. The work content detection determination system according to claim 4, wherein the computer is further configured to detect a predetermined work sound in the sound signal based on a difference in volumes or propagation characteristics indicated in a first signal generated by the first microphone and a second signal generated by the second microphone.

6. The work content detection determination system according to claim 1, wherein the pressure sensor and the motion sensor comprise a pressure sensitive sheet including conductive particles, the pressure sensitive sheet configured to:
   detect a pressure from a sensing signal thereof; and
   detect a slip signal based on a change of the sensing signal.

7. The work content detection determination system according to claim 6, wherein the computer is further configured to:
   determine the work content based on a timing of detecting the slip signal occurring after the detection timing of a predetermined work sound detected in the sound signal.

8. The work content detection determination system according to claim 6, wherein the motion sensor comprises an acceleration sensor configured to generate an acceleration signal, and
   the computer is further configured to determine the work content based on a detection timing of a predetermined work sound detected in the sound signal, a detection timing of predetermined slippage detected in the slip signal, and a detection timing of a predetermined acceleration the acceleration signal.

9. The work content detection determination system according to claim 1, wherein the motion sensor comprises an acceleration sensor that detects an acceleration signal, and the computer is further configured to determine the work content using a detection timing of a predetermined work sound detected in the sound signal, a detection timing of a predetermined pressure detected in the pressure signal, and a detection timing of a predetermined acceleration detected in the acceleration signal.

10. The work content detection determination system according to claim 1, wherein the computer is further configured to store the work content in memory as a work log in association with work information registered in advance.

11. The work content detection determination system according to claim 1, further comprising:

processor configured to generate a composite signal based on the sound signal from the microphone and the pressure signal from the pressure sensor, and wherein:

the wireless transmitter is furhter configured to wirelessly transmit the composite signal to the computer as a single wireless signal, and the computer is further configured to determine the work content responsive to decomposing the composite signal into sensor information signals to which times are assigned.

12. A wearable sensor embedded glove that is worn on a hand of a worker and observes a hand operation in which the hand works on a work target through a contact of the hand with the work target, the glove comprising:

a microphone that detects a work sound of the work target;

a pressure sensor that detects a pressure of a work of the hand operation;

a motion sensor that detects a motion of the hand; and a wireless transmitter that wirelessly transmits signals of the microphone, the pressure sensor, and the motion sensor to a computer, causing the computer to determine a work content of the worker based on a difference between a detection timing of a predetermined work sound in a sound signal detected by the microphone and a detection timing of a slip signal in a pressure signal detected by the pressure sensor satisfying a threshold.

13. The wearable sensor embedded glove according to claim 12, wherein the pressure sensor is further configured to detect a pressure of the work of the hand operation and to detect the slip signal.

14. The wearable sensor embedded glove according to claim 12, wherein the microphone is a first microphone, and the wearable sensor embedded glove further comprises a second microphone, the first microphone attached to a first location close to a place where the work sound is generated, the second microphone attached to a second location farther from the place where work sound is generated than the first location.

15. A system, comprising:

a computer configured to:

receive, from a glove comprising a microphone, a pressure sensor, and an acceleration sensor, a sound signal from the microphone detecting a work sound, a pressure signal from the pressure sensor detecting a pressure of a work of a hand operation, a slip signal detected by the pressure sensor, and an acceleration signal from the acceleration sensor detecting an acceleration of the glove;

detect a slip signal based on a change in the pressure signal; and determine a work content of a worker based on the sound signal, the pressure signal, the slip signal and the acceleration signal, the work content determined further based on a difference between a detection timing of a predetermined work sound detected in the sound signal and a detection timing of the slip signal satisfying a threshold.

* * * * *